(12) United States Patent
Hasinovic et al.

(10) Patent No.: US 7,976,624 B2
(45) Date of Patent: Jul. 12, 2011

(54) NANO GEL WAX

(75) Inventors: Hida Hasinovic, Lexington, KY (US); Gefei Wu, Lexington, KY (US)

(73) Assignee: Ashland Licensing and Intellectual Property, LLC

( * ) Notice: Subject to any disclaimer, the term of this patent is extended or adjusted under 35 U.S.C. 154(b) by 0 days.

(21) Appl. No.: 12/945,329

(22) Filed: Nov. 12, 2010

(65) Prior Publication Data

US 2011/0132227 A1 Jun. 9, 2011

Related U.S. Application Data

(60) Provisional application No. 61/266,688, filed on Dec. 4, 2009.

(51) Int. Cl.
*C09D 191/06* (2006.01)
*C09G 1/02* (2006.01)
*C09G 1/08* (2006.01)

(52) U.S. Cl. ............ 106/272; 106/3; 106/10; 106/270; 106/271; 51/307; 51/308; 51/309

(58) Field of Classification Search ............... 106/3, 10, 106/270, 271, 272; 51/370, 308, 309
See application file for complete search history.

(56) References Cited

U.S. PATENT DOCUMENTS

| | | | |
|---|---|---|---|
| 4,097,302 A * | 6/1978 | Cohen et al. | 106/312 |
| 4,398,953 A | 8/1983 | van der Linde | |
| 5,017,222 A | 5/1991 | Cifuentes et al. | |
| 5,154,759 A | 10/1992 | Cifuentes et al. | |
| 5,330,787 A | 7/1994 | Berlin et al. | |
| 5,462,587 A | 10/1995 | Greenleaf et al. | |
| 5,782,962 A | 7/1998 | Burke et al. | |
| 5,925,341 A * | 7/1999 | Cervantes et al. | 424/78.03 |
| 6,013,323 A | 1/2000 | Klayder et al. | |
| 6,342,556 B1 * | 1/2002 | Batdorf et al. | 524/432 |
| 6,461,537 B1 * | 10/2002 | Turcotte et al. | 252/194 |
| 6,506,715 B1 | 1/2003 | Schultz et al. | |
| 6,533,850 B1 | 3/2003 | Kaiser et al. | |
| 6,562,114 B1 | 5/2003 | Yeiser et al. | |
| 6,607,717 B1 * | 8/2003 | Johnson et al. | 424/70.12 |
| 7,101,528 B2 | 9/2006 | Martin et al. | |
| 7,374,592 B2 | 5/2008 | Hasinovic et al. | |
| 7,381,250 B2 * | 6/2008 | Hasinovic et al. | 106/10 |
| 7,393,401 B2 * | 7/2008 | Hasinovic et al. | 106/271 |
| 7,503,963 B2 | 3/2009 | Jordan et al. | |
| 7,503,964 B2 * | 3/2009 | Hasinovic | 106/10 |
| 2002/0149002 A1 * | 10/2002 | Womelsdorf et al. | 252/363.5 |
| 2003/0075077 A1 | 4/2003 | Lewis | |
| 2007/0221089 A1 | 9/2007 | Hasinovic et al. | |
| 2008/0017071 A1 | 1/2008 | Moebus et al. | |
| 2009/0197105 A1 * | 8/2009 | Buchholz et al. | 428/473.5 |

FOREIGN PATENT DOCUMENTS

JP 1-123669 * 5/1989

* cited by examiner

*Primary Examiner* — Anthony J Green
(74) *Attorney, Agent, or Firm* — Wood, Herron & Evans, LLP

(57) ABSTRACT

An aqueous gel wax formulation includes a cationic wax microemulsion and an anionically charged polishing agent having a particle size less than about 200 nanometers and optimally a quaternary ammonium substituted silicone and an amino functional silicone. The components combine to form a gel wax formulation which can be applied without buffing.

8 Claims, No Drawings

NANO GEL WAX

BACKGROUND OF THE INVENTION

Waxes are used to provide exterior protection and shine for automobiles, boats, planes, trucks and other vehicles. The wax reduces the damage caused by exposure to heat and light, which can degrade material over time.

Typical liquid waxes are applied onto a surface and must dry. After drying, they are buffed, creating a white powder. This white powder must then be removed. Further, such liquid waxes may discolor black trims and molding.

Generally, liquid waxes include petroleum distillate based solvents. These solvents are not environmentally friendly and most of them are volatile organic compounds, which are heavily regulated.

Further, liquid waxes typically are lotion like consistency emulsions that will include, waxes, polishing agents, and rheology modifiers, in order to establish an effective viscosity necessary for their stability and application.

SUMMARY OF THE INVENTION

The present invention is premised on the realization that a water-based liquid gel wax that does not generate white residue can be formulated from a cationic wax microemulsion, a quaternary ammonium polydimethyl siloxane, alumina particles having an anionically charged surface, and water. The formulation, when blended together, forms a gel without the addition of any other thickening agents, and without inclusion of any petroleum solvent. The gel consistency simplifies application, and provides the ability to apply and buff the wax in one step.

The present invention further may include an amino functional polymethoxy siloxane to improve the bond between the wax coating and the painted surface providing a longer lasting wax protection with excellent water and detergent resistance. In addition, antimicrobials and fragrances may be added to these formulations.

In particular, the gel is formulated by combining the cationic wax microemulsion with the anionically charged alumina particles in combination with the quaternary ammonium silicone. Over a period of 2 to 25 days, the formulation forms a highly viscous gel.

The wax can be applied in a one step application by applying the wax and immediately buffing it off, or the wax can be rubbed onto a surface and allowed to dry, then it is buffed off.

The objects and advantages of the present invention will be further appreciated in light of the following detailed description.

DETAILED DESCRIPTION

According to the present invention a gel wax formulation includes water, anionically charged alumina particles, a cationically charged wax microemulsion and a quaternary polydimethyl siloxane also referred to as a silicone quat. In addition to the above, the formulation may further include an aminomethoxy functional polymethoxy silane, typical antimicrobials, and fragrances.

The wax microemulsion may include either synthetic or natural waxes having a cationic charge whereby the wax provides a surface-active substance in which the active constituent is the positive ion.

A cationic microemulsion of carnauba wax is particularly suitable for this gel wax formulation. Other plant waxes such as candelilla, orange-peel, montan, and/or Japan wax could also be utilized in the present invention as alternate wax components in a cationic microemulsion form. Synthetic waxes such as polyethylene wax, polypropylene wax, polyamide wax, and combinations thereof can also be utilized in the instant invention.

One particular cationic microemulsion includes about 12-15 percent by weight solid wax particles having a particle size of from about 10 to 200 nanometers. The water based emulsion contains ethylene glycol as co-emulsifier at about 20% by weight and an aliphatic amine derivative as an emulsifier. Tomah Products, Inc. sells such a product under the trade name of Emulsion C-340. Advanced Polymer, Inc. also sells a cationic carnauba emulsion under the trade name APS-319. This emulsion has a smaller droplet size and is formulated without ethylene glycol.

Of course the wax component for this application could be obtained dry and dispersed within the blend of components separately to form the emulsion providing the same functional qualities; however, it is more convenient to obtain the wax in the form of an emulsion from commercial vendors.

The wax microemulsion with about 12-20 weight of % wax content is added to the wax composition blend in an amount effective to form a thin film required for appropriate protection of an applied surface. Typically, the wax microemulsion will be present in an amount of 0.1 to 50.0 percent by weight, and more preferably in a range of from 5.0 to 30.0 percent by weight, and more preferably in a range of from between 8.0 to 25.0 percent by weight based on the total weight of the composition. One preferred formulation uses 18 percent by weight of a carnauba emulsion that contains 12% of a pure Brazilian carnauba wax.

The above percents by weight are based on the amount of 12% wax emulsion in the total composition rather than the percent of the active ingredient pure wax. For instance, use of a 12% cationic carnauba wax microemulsion in an amount of 20.0 weight percent results in about 2.4% by weight of the carnauba wax as an active ingredient based on the weight of the total composition.

The wax formulation also includes a quaternary ammonium functional silicone commonly referred to as a silicone quat. The silicone quat gives a deep shine while providing a quick drying time and antistatic properties to the wax formulation. Furthermore, it provides excellent luster and superior beading and sheeting action. The silicone quat has a low viscosity of from 150 cP to 500 at 25° C., and is stable at acidic pH. Unlike conventional silicone products, silicone quat molecules actually unfold to provide a leveling condition and smoother surface for adherence of the wax particles.

Suitable silicone quats are disclosed in U.S. Pat. No. 5,925,341 by Cervantes et al. issued on the 20 of Jul. of 1999, U.S. Pat. No. 6,607,717 by Johnson et al. which issued on the 19 of Aug. of 2003, and U.S. Pat. No. 6,461,537 which issued on the 8 of Oct. of 2002 all of which are incorporated herein by reference.

The present invention can utilize a silicone quat such as is sold under the trade name of Tego-Polish Additiv Q-70, available from Degussa having a pH range of from 7 to 9, viscosity from 150-500 cps @ 25° C., and a density @ 25° C. of from 0.950 to 0.970 g/ml. It is a quaternary blend containing 70 percent solids of a long chain silicone quat having 70 percent active quaternary sites in 2-propanol, 1-butoxy. It has a pH of 8.5 and dynamic viscosity of 250 mPAs at 25° C. as measured on a Brookfield viscometer.

Silicone quats are also sold by Siltech Corporation under the trade name SILQUAT, particularly SILQUAT 3180 can be used for this application.

Another preferred silicone quat is available from the Dow Corning Corporation and comprises nanometer size silicone quat particles in a microemulsion form and sold under the trade name of DOW CORNING 5-7113 which is a silicone quat microemulsion comprising a 25% non-ionic emulsion of a cationic quaternary ammonium functional silicone polymer.

The silicone quat is present in an amount of from 1 percent by weight of the total composition to about 50 percent by weight of the total weight of the composition. Typical formulations include 0.5 to 25 percent by weight actives, and more typically 1.0 to 25 percent by weight, with narrower ranges from 2.0 to 15 percent by weight, and generally between 3.0 to 10 percent by weight based on the total weight of the composition. One preferred formulation includes about 5.0 percent actives by weight.

The formulation also includes anionically changed nano sized polishing particles. These particles remain dispersed in the formulation and do not form a white powder upon drying. Generally, the particle size ranges from about 20 to about 200 nanometers. The particles are modified by reacting the inorganic particles with an anionic moiety so that the surface of the particles have an anionic charge.

Exemplary anionically charged particles are alumina particles with an exposed sulfonate group. These are formed by reacting alumina particles with sodium paratolulene sulfonate. One commercially available product is Dispal 25 SR alumina, sold by Sasol North America Incorporated. Other anionically charged nanoparticle particulate abrasives, such as silicates, can be used in place of the alumina. As long as the abrasive particle includes an anionically charged surface and has a particle size less than about 200 nanometers, it should be suitable for use in the present invention.

Generally, the wax composition will include from about 0.5 to about 20 weight % of anionically charged nanoparticles, in particular, alumina particles. An alumina concentration of 4% or higher is selected for certain formulations to assist in gel formation.

In addition to the wax emulsion, silicone quat and anionically charged alumina particles, the wax formulation can further include a liquid amino functional siloxane. These amino functional siloxanes are produced by major silicone suppliers and they are available such as high activity fluids or sold in an emulsion form. They are generally cationically charged and are attracted to the painted surface of automobiles, providing a stronger bond between the wax coating and the surface being coated. Commercially available products include Dow Corning 536 fluid (XIAMETER OFX-0536 FLUID) and Dow Corning 531 fluid. Both are aminomethoxy functional polydimethoxyl silanes, however Dow Corning 536 Fluid is preferred for use in this invention because of its 100 weight % activity level. It is sold as a solvent free silane version. The amino functional silane is added in an amount from about 0 to about 10 weight % actives and, more typically, 0.1 to 5, preferably 1%, by weight in one formulation. These provide shine and enhance protection. In particular, they provide detergent resistance so the wax provides continued protection even after multiple car washes.

In addition aminofuctional silicone SF 1706 sold by GE and now available form Momentive can be used for this application. SF-1706 is 100 weight silicone. Based on its MSDS it does contain 10-30 weight % of aminofunctional silicone and rest are polydimethylsiloxanes at 60-90 weight % and cyclosiloxane at 1 weight %. Amino functional fluids are also sold by Wacker, Siltech Corporation, and others.

Although not required, an effective amount of one or more fragrances may be added to the instant invention to impart a desirable scent to the product. Preferably the fragrance is present in an amount of up to 2 percent by weight, and, more typically, from between 0.001 to 1.0 percent by weight, and generally 0.01 to 0.5 percent by weight. One preferred embodiment contains about 0.4 percent by weight of fruity bouquet based on the total weight percent of the composition.

A biocide compatible with this cationic charged formulation such as BIOBAN BP PLUS may also be added in an amount of about 0.1 weight % to 0.5 weight %, by weight of the total composition.

Dyes, and/or colorants may also be added to the wax composition in an effective amount of less than 0.1 percent by weight based on the total weight of the composition.

The remainder of the formulation will be deionized water. High purity water is preferred, since minerals in the water can interfere with the gel formation and reduce the formulation transparency.

The formulation is substantially free of thickeners or rheology modifiers commonly used in these types of applications, i.e., if present at all, they would not be present in an amount effective to significantly increase the viscosity of the final formulation.

The formulation is also substantially free of volatile organic petroleum solvents or low vapor pressure petroleum solvents. Organic solvents could be present in one of the above components, such as a solvent for the fragrances or very minor amounts of petroleum solvent may be used as a carrier phase or a solubilizer for amino functional silicone fluid DC 531. Therefore, substantially free of volatile organic solvents means the total concentration of petroleum solvent in the wax formulation will be less than 2%, more typically less than 1.5%, and generally 1% or less.

The gel wax formulation is prepared by combining the anionically charged nanoparticles with the water and mixing this until a uniform dispersion is obtained; generally about 15 minutes. Next, the wax emulsion is added and mixed again for about 10 minutes. This is followed by the addition of the silicone quat. With this addition, enhancement in viscosity is observed; however, gel-like consistency is achieved upon standing. This formulation is highly thixotropic and it does exhibits exceptional shear thinning ability, the thickening of the formulation will be observed only after the mixing is stopped. Under the normal conditions they are highly viscous and when agitated or shaken they became fluids. This property of the gel is very desirable for easier application of the product.

The aminofuntional silicone fluid, biocide and fragrance are then combined at this time and, again, thoroughly mixed. This initially forms a relatively low viscosity fluid, which, upon storage, will form a very viscous gel having an increase in viscosity of 10 to 20 fold. Generally, the viscosity will be greater than 1000 cP up to about 20,000. The product undergoes shear thinning. Thus, the viscosity of the product can be reduced by shaking it in the container, thus facilitating application by squeezing the gel like product from a bottle, or even spraying the product on a surface and buffing it with a microfiber towel.

The invention will be further appreciated in light of the following detailed Example.

Example 1

A wax composition having the components set forth in Table 1 was formulated by initially adding the water and combining it with the Dispal 25 SR to the water and mixing well for 15 minutes until uniform alumina dispersion is obtained. Tomah C-340 was added and mixed for 10 to 15 minutes, followed by the Tago-Polish Additiv Q-70, which was mixed for additional 10 to 15 minutes. Finally, the biocide Ventocil IB and the fragrance sweet cherry AA 069585 were added and the gel consistency of the product increased over a period of time. More particularly, the product was allowed to rest for a period of 21 days, forming a gel wax formulation with a viscosity of 2400-2600 cP with an initial viscosity, immediately after mixing, of 100-150 cP which increased to 1250 cP over a period of 3 days.

| FORMULATION #1 | |
|---|---|
| Chemical Ingredients | Weight (%) |
| 1. Water DI | 71.70 |
| 2. Dispal 25 SR | 4.00 |
| 3. Tomah C-340 | 18.00 |
| 4. Tego-Polish Additiv Q-70 | 5.00 |
| 5. DC 536 Fluid | 1.00 |
| 6. Ventocil IB | 0.10 |
| 7. Sweet Cherry AA 069585 | 0.20 |

The wax formulation is used by applying it directly to a surface such as the exterior of a car and rubbing it lightly to spread it across the surface with, for example, a microfiber towel. The wax formulation is allowed to dry. Typically, no further buffing is required. The following wax formulations were prepared using the order of addition set forth in Example 1.

Example 2

| FORMULATION #2 | |
|---|---|
| Chemical Ingredients | Weight (%) |
| 1. Water DI | 66.85 |
| 2. Dispal X-25SR | 5.00 |
| 3. Tego Polish Additiv Q-70 | 6.00 |
| 4. Tomah C-340 | 20.0 |
| 5. BYK Silclean 3720 | 2.00 |
| 6. Iriodin Flash Gold | 0.05 |
| 7. Almond F-127400 | 0.10 |

Example 3

| FORMULATION #3 | |
|---|---|
| Chemical Ingredients | Weight (%) |
| 1. Water DI | 67.75 |
| 2. Dispal X-25SR | 5.00 |
| 3. Tego Polish Additiv Q-70 | 6.00 |
| 4. Tomah C-340 | 20.00 |
| 5. DC Fluid 536 Fluid | 1.00 |
| 6. Dantogard | 0.15 |
| 7. Black Cherry RA-136730 | 0.10 |

Example 4

| FORMULATION #4 | |
|---|---|
| Chemical Ingredients | Weight (%) |
| 1. Water DI | 73.15 |
| 2. Dispal X-25SR | 3.00 |
| 3. Tego Polish Additiv Q-70 | 4.00 |
| 4. Tomah C-340 | 18.0 |
| 5. DC Fluid 536 Fluid | 1.00 |
| 6. Dantogard | 0.15 |
| 7. Black Cherry RA-136730 | 0.20 |
| 8. Carbopol EZ-3 | 0.50 |

Example 5

| FORMULATION #5 | |
|---|---|
| Chemical Ingredients | Weight (%) |
| 1. Water DI | 71.20 |
| 2. Dispal X-25SR | 4.00 |
| 3. Tego Polish Additiv Q-70 | 4.00 |
| 4. Tomah C-340 | 18.00 |
| 5. DC Fluid 531 Fluid | 2.50 |
| 6. Vantocil IB | 0.10 |
| 7. Sweet Cherry AA 09585 | 0.20 |

Each of these formulations provided a stable viscous aqueous gel wax.

The wax formulation does not leave any white residue commonly present in these types of applications. The absence of this white residue can be attributed to the alumina polishing agent nanoparticles being completely dissolved in deionized water as a carrier phase. The carnauba wax nano-particles and alumina particles provide a translucent gel formulation. This can be applied to any exterior hard automotive surface other than cloth. It is suitable for application to painted metal, plastic, rubber, and metal surfaces.

Further, this composition is easy to apply due to its pseudo-plastic properties. It can also cover more surface area as compared to conventional wax products. Its small particle size also allows it to fill out small scratches.

This has been a description of the present invention along with the preferred method of practicing the present invention. However, the invention itself should only be defined by the appended claims.

Wherein we claim:

1. An aqueous based gel wax formulation comprising a cationic microemulsion of wax particles said wax particles having an average size of less than about 200 nanometers; and anionically charged polishing particles having an average size of less than 200 nanometers.

2. The aqueous based gel wax formulation claimed in claim 1 further comprising a quaternary ammonium substituted silicone.

3. The aqueous based gel wax formulation claimed in claim 1 wherein said anionically charged polishing particles comprise alumina particles.

4. The aqueous based gel wax formulation claimed in claim 1 wherein said wax particles are carnauba wax.

5. The aqueous based gel wax formulation claimed in claim 3 wherein said formulation includes amino functional polydimethoxy silane.

6. The aqueous based gel wax formulation claimed in claim 3 wherein said formulation includes at least about 1% anionically charged alumina particles on an actives basis.

7. The aqueous based gel wax formulation claimed in claim 2 wherein said quaternary ammonium substituted silicone is present in an amount of at least about 0.5% actives by weight.

8. The aqueous based gel wax formulation claimed in the claim 1 being substantially petroleum solvent free.

* * * * *